United States Patent [19]

Sasaki et al.

[11] Patent Number: 5,661,831
[45] Date of Patent: Aug. 26, 1997

[54] OPTICAL MODULE HAVING SELF-ALIGNED OPTICAL ELEMENT AND OPTICAL WAVE-GUIDE BY MEANS OF BUMPS ON RECTANGULAR PADS AND METHOD OF ASSEMBLING THEREOF

[75] Inventors: Jun-Ichi Sasaki; Masataka Itoh; Hiroshi Honmou; Toshitaka Torikai, all of Tokyo, Japan

[73] Assignee: NEC Corporation, Tokyo, Japan

[21] Appl. No.: 572,158

[22] Filed: Dec. 13, 1995

[30] Foreign Application Priority Data

Dec. 22, 1994 [JP] Japan .................................. 6-320805

[51] Int. Cl.$^6$ ............................................... G02B 6/36
[52] U.S. Cl. .................... 385/49; 385/89; 385/88; 385/147; 359/900
[58] Field of Search .............................. 385/88–94, 14, 385/49, 147; 359/900

[56] References Cited

U.S. PATENT DOCUMENTS

| 5,160,409 | 11/1992 | Moore et al. | 156/656 |
| 5,247,597 | 9/1993 | Blacha et al. | 385/88 |
| 5,283,446 | 2/1994 | Tasisawa | 257/433 |

FOREIGN PATENT DOCUMENTS

| 0-475519 | 9/1991 | European Pat. Off. . |
| 4152682 | 5/1992 | Japan . |
| WO 93/15424 | 8/1993 | WIPO . |

OTHER PUBLICATIONS

Deshmukh R. D., et al. "Active Atmosphere Solder Self-Alignment and Bonding of Optical Components", International Journal of Microcircuits and Electronic Packaging, vol. 16, No. 2, 2$^{nd}$ Quarter 1993, pp. 97–107.

J. Sasaki et al.; "Self-aligned Assembly for Optical Devices Using AuSn Solder Bump Bonding"; Institute of Electronics, Information and Communication Engineers, OQE 93-145 (1993-12); pp. 61–66.

M. J. Wale et al.; "Self-Aligned Flip-Chip Assembly of Photonic Devices with Electrical and Optical Connections"; IEEE Transactions on Components, Hybrids, and Manufacturing Technology, vol. 13, No. 4, Dec. 1990; pp. 780–786.

Primary Examiner—John Ngo
Attorney, Agent, or Firm—Whitham, Curtis, Whitham & McGinn

[57] ABSTRACT

An optical module has an optical wave-guide structure formed on a silicon substrate and a laser diode array solder bonded to first pads patterned on the silicon substrate in a self-aligned manner by virtue of surface tension of solder during a reflow stage, and the first pads are shaped into a rectangular parallelopiped configuration so as to make a ratio of a solder bump height to a pad width large without decrease of the volume of the solder bump, thereby generating large surface tension.

13 Claims, 8 Drawing Sheets

5,661,831

OPTICAL MODULE HAVING SELF-ALIGNED OPTICAL ELEMENT AND OPTICAL WAVE-GUIDE BY MEANS OF BUMPS ON RECTANGULAR PADS AND METHOD OF ASSEMBLING THEREOF

FIELD OF THE INVENTION

This invention relates to an optical module and, more particularly, to the structure of an optical module having an optical element and an optical wave-guide self-aligned with one another on a substrate and a method of assembling the optical module.

DESCRIPTION OF THE RELATED ART

An optical module is incorporated in an optical communication system and an optical transmission system, and includes an optical element such as a laser diode and an optical wave-guide fabricated on a silicon substrate. The optical wave-guide has a core, and the core propagates light therealong. On the other hand, the laser diode has an active layer, and laser beam is radiated from the active layer. In order to guide the laser beam along the core, it is necessary for the core to be aligned with the active layer, and the optical wave-guide and the laser diode are assembled on the silicon substrate such that the active layer is aligned with the core.

The laser diode had been manually aligned with the active layer, and large amount of time and labor was consumed in the assembling work. The manual assembling work increased the cost, and the optical module was high-price.

A self-alignment technology has been developed, and a typical example of the self-alignment technology is disclosed by Sasaki et. al. in "Self-aligned Assembly for Optical Devices Using AuSn Solder Bump Bonding", Technical Report of the Institute of Electronics Information and Communication Engineers, pages 61 to 66.

FIGS. 1A, 1B and 2A and 2B illustrate the self-aligned assembly proposed by Sasaki et. al. Reference numerals 1, 2 and 3 designate a silicon substrate, an optical wave-guide and a laser diode, respectively. The three-axis reference system is represented by arrows "x", "y" and "z". The optical wave-guide 2 has a core $2a$, and the optical axis of the core $2a$ is labeled with reference $2b$. On the other hand, an active layer $3a$ is incorporated in the laser diode 3, and the optical axis of the active layer $3a$ is labeled with $3b$.

The optical wave-guide 2 and the laser diode 3 are aligned on the major surface of the silicon substrate 1 as follows. The optical wave-guide 2 is fabricated on the silicon substrate 1, and the core $2a$ and circular pads $1a$, $1b$, $1c$ and $1d$ are concurrently patterned on the major surface of the silicon substrate 1 by using a lithographic process. As a result, the circular pads $1a$ to $1d$ are accurately positioned with respect to the core $2a$, and the error of the relative position between the core $2a$ and the circular pads $1a$ to $1d$ is roughly equal to the mask mis-alignment in the lithographic process.

Subsequently, solder bumps 4 are provided on the circular pads $1a$ to $1d$, respectively. Circular pads $3c$, $3d$, $3e$ ad $3f$ have been already formed on the back surface of the laser diode 3, and the relative position between the circular pads $3c$ to $3f$ and the active layer $3a$ is identical with the relative position between the circular pads $1a$ to $1d$ and the core $2a$.

The laser diode is put on the solder bumps 4 in such a manner as to roughly align the circular pads $1a$ to $1d$ with the circular pads $3c$ to $3f$. However, the circular pads $3c$ to $3f$ are usually offset from the circular pads $1a$ to $1d$, and, accordingly, the optical axis $2b$ of the core $2a$ is not aligned with the optical axis $3b$ of the active layer $3a$ as shown in FIGS. 1A and 2A.

Heat is applied to the solder bumps 4, and the solder bumps 4 are reflowed. The surface tension in the reflowed solder bumps forces the circular pads $3c$ to $3f$ to move in a direction ST, and the circular pads $1a$ to $1d$ are registry with the circular pads $3c$ to $3f$, respectively. As described above, the relative position between the circular pads $1a$ to $1d$ and the core $2a$ is identical with the relative position between the circular pads $3c$ to $3f$ and the active layer $3a$, and the circular pads $3c$ to $3f$ registry with the circular pads $1a$ to $1d$ automatically aligns the optical axis $3b$ of the active layer $3a$ with the optical axis $2b$ of the core $2a$ as shown in FIG. 2B.

Thus, the prior art self-aligned assembling technology allows the manufacturer to assemble the optical modules at high speed, and the production cost is drastically decreased.

However, only appropriately designed bumps generate the surface tension large enough to self-align the optical axis $3b$ of the active layer $3a$ with the optical axis $2b$ of the core $2a$. The large surface tension requires a large ratio of the bump height to the pad diameter. In other words, the large surface tension is generated only when the bumps are formed in a large aspect ratio. If the soldering is carried out without flux, the large surface tension requires a larger aspect ratio.

The present inventors evaluated various bumps formed on the circular pads, and concluded that the prior art self-aligned flux-less solder bonding in nitrogen atmosphere required the ratio of the bump height to the pad diameter equal to or greater than 0.75. The smaller the pad diameter was, the higher the alignment accuracy was.

Therefore, when an optical device shaped into 300 micron cube is aligned with an optical wave-guide on a silicon substrate, it is appropriate for the circular pads to be at least 50 microns in diameter because of sufficient joint force and large heat radiation capability, and the minimum bump height for the flux-less solder bonding is equal to or greater than 38 microns.

However, the core $2a$ of a latest optical wave-guide is spaced from the major surface of the silicon substrate 1 by only 20 microns or less, and the bumps of 38 microns high are not available for an optical module with the latest optical wave-guide spaced from the major surface by only 20 microns or less. The latest optical wave-guide requires the manufacturer to miniaturize the bumps without change of the ratio of the bump height to the pad diameter.

If the latest optical wave-guide 2 is lifted up, the appropriate bumps 4 may be available without the miniaturization. However, when the bumps 4 are formed from pieces of solder provided on the circular pads through a punching, which is described hereinbelow in detail, the bump height ranges 50 microns plus or minus 1.5 microns, and the fluctuation of the bump height is too large to couple the laser diode 3 to the optical wave-guide 2 in a single mode. Therefore, the miniaturization is desirable.

The following problems are encountered in the miniaturization of the bumps.

First, the reduction of the pad diameter results in insufficient joint force and poor heat radiation capability. This is the first problem.

The second problem is that the miniature bumps are hardly formed by using an economical punching process. Au-Sn eutectic solder is usually used for the bumps 4, and the Au-Sn eutectic solder bumps are economically formed from a Au-Sn eutectic foil through a punching process disclosed in Japanese Patent Publication of Unexamined Application No. 4-152682. FIGS. 3A to 3C illustrate the process of forming bumps from a Au-Sn solder foil.

First, the Au-Sn solder foil 5 is intermittently moved between a punch 6a and a die 6b, and a pad 7a formed on the major surface of a silicon substrate 7b is moved to an appropriate position beneath the die 6b as shown in FIG. 3A. The punch 6a is downwardly moved so as to cut off a piece 5a of Au-Sn solder from the Au-Sn solder foil 5, and the piece 5a of Au-Sn solder is put on the pad 7a as shown in FIG. 3B. Heat is applied to reflow the pieces of Au-Sn solder. The surface tension shapes the reflowed Au-Sn solder into a semi-spherical configuration as shown in FIG. 3C.

The prior art process shown in FIGS. 3A to 3C is economical, and is desirable for the optical modules. However, the volume of the piece 5a is hardly decreased to a critical value. The presently available punching technology sets limits on the size of the punch 6a, the thickness of the Au-Sn solder foil 5 and the volume of the Au-Sn solder piece 5a, and the minimum punch diameter, the minimum foil thickness and the minimum volumes are of the order of 40 microns, 20 microns and 2500 cubic microns, respectively.

When the heat was applied to the minimum Au-Sn solder piece 5a, the minimum Au-Sn solder piece 5a was reflowed into the semi-spherical bump 5b. The semi-spherical bump 5b was 30 microns in height, and the bottom surface and, accordingly, the pad 7a is 30 microns in diameter. After the solder bonding, the bump height was decreased to 25 microns. However, the height was too high to the alignment with the core 2a.

Of course, the Au-Sn solder bumps are formed through other processes such as a plating or a vacuum evaporation. However, the plating can not exactly control the thickness of a Au-Sn solder layer on the pad, and the vacuum evaporation is complex and expensive.

SUMMARY OF THE INVENTION

It is therefore an important object of the present invention to provide an optical module which has an optical waveguide and an optical element aligned with one another around 20 microns in height without reduction of joint force and heat radiation capability and increase of the production cost.

To accomplish the object, the present invention proposes to change the configuration of pads, which increases the surface tension.

In accordance with one aspect of the present invention, there is provided an optical module fabricated on a substrate, comprising: an optical wave propagation means formed on the substrate, and having a core propagating light; a plurality of first pads formed on the substrate, and located at certain relative positions with respect to the core, each of the plurality of first pads having at least one generally rectangular upper surface; and an optical element having a port aligned with the core so as to allow the light to pass therethrough and a plurality of second pads located at the certain relative positions with respect to the port and bonded through solder bumps to the plurality of first pads, each of the plurality of second pads having at least one generally rectangular lower surface with which the at least one generally rectangular upper surface is overlapped.

In accordance with another aspect of the present invention, there is provided a method of assembling an optical module, comprising the steps of: forming a plurality of first pads and a core of an optical wave propagation means on an upper surface of a substrate and a plurality of second pads on a back surface of an optical element by using lithographic techniques, the plurality of first pads being located at certain relative positions with respect to the core, the plurality of second pads being located at the certain relative positions with respect to a port, each of the plurality of first pads having at least one generally rectangular upper surface, each of the plurality of second pads having at least one generally rectangular lower surface corresponding to the at least one generally rectangular upper surface; placing solder pieces on the plurality of first pads, respectively; heating the solder pieces for forming solder bumps on the plurality of first pads; putting the optical element on the solder bumps in such a manner that the solder bumps are respectively brought into contact with the plurality of second pads; reflowing the solder bumps so as to self-align the at least one generally rectangular upper surface of each of the plurality of first pads with the at least one generally rectangular lower surface of each of the plurality of second pads, thereby causing the port to be aligned with the core; and bonding the plurality of first pads to the plurality of second pads through a solidification of the solder bumps.

BRIEF DESCRIPTION OF THE DRAWINGS

The features and advantages of the optical module and the method of assembly according to the present invention will be more clearly understood from the following description taken in conjunction with the accompanying drawings in which.

DESCRIPTION OF THE PREFERRED EMBODIMENTS

First Embodiment

Figure 1A:
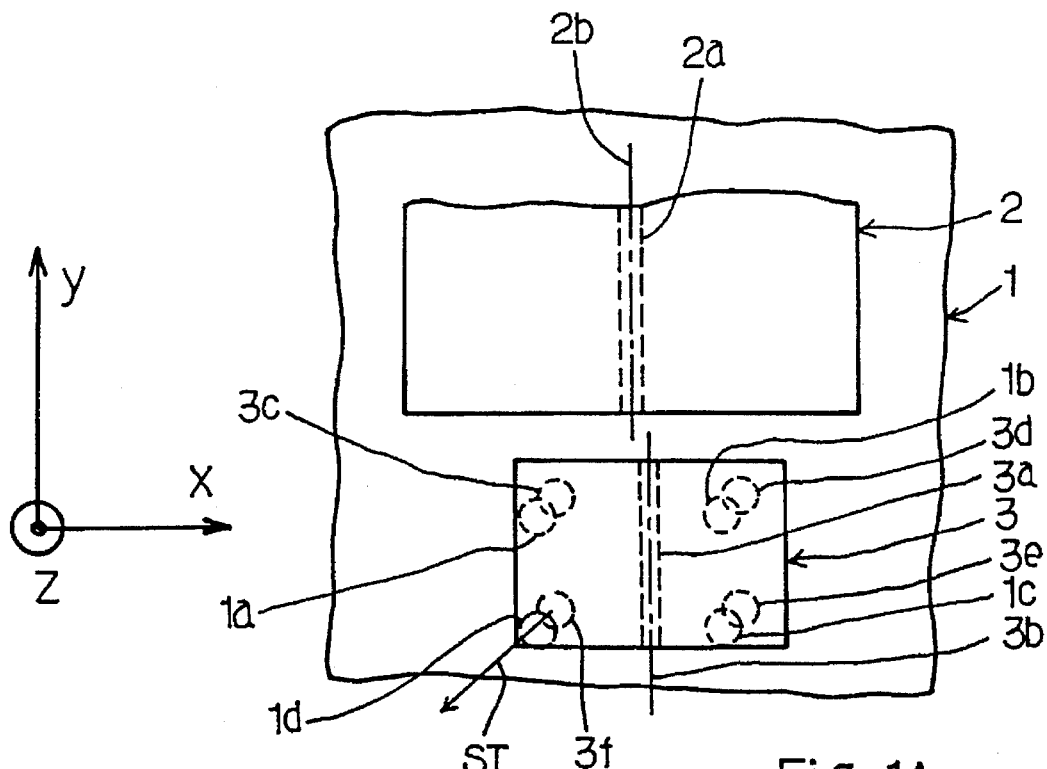
FIGS. 1A and 1B are plan views showing the prior art method of assembling the optical module.
Figure 2A:
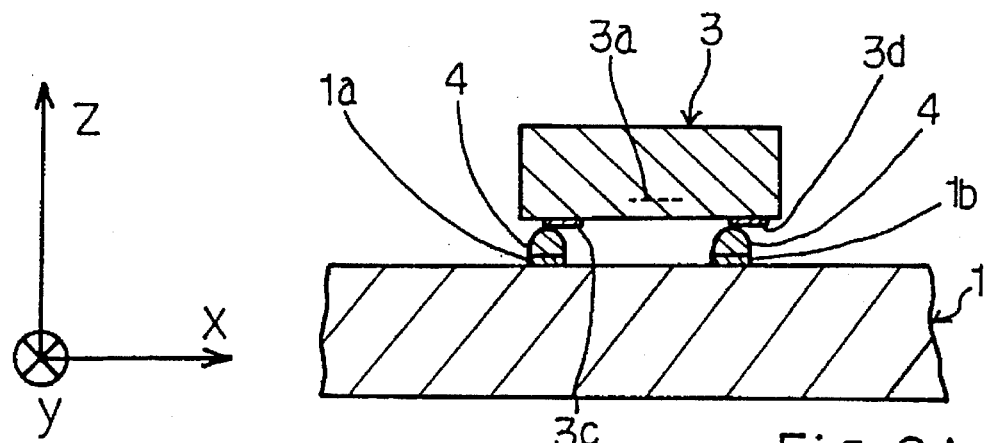
FIGS. 2A and 2B are cross sectional views showing the prior art method.
Figure 1B:
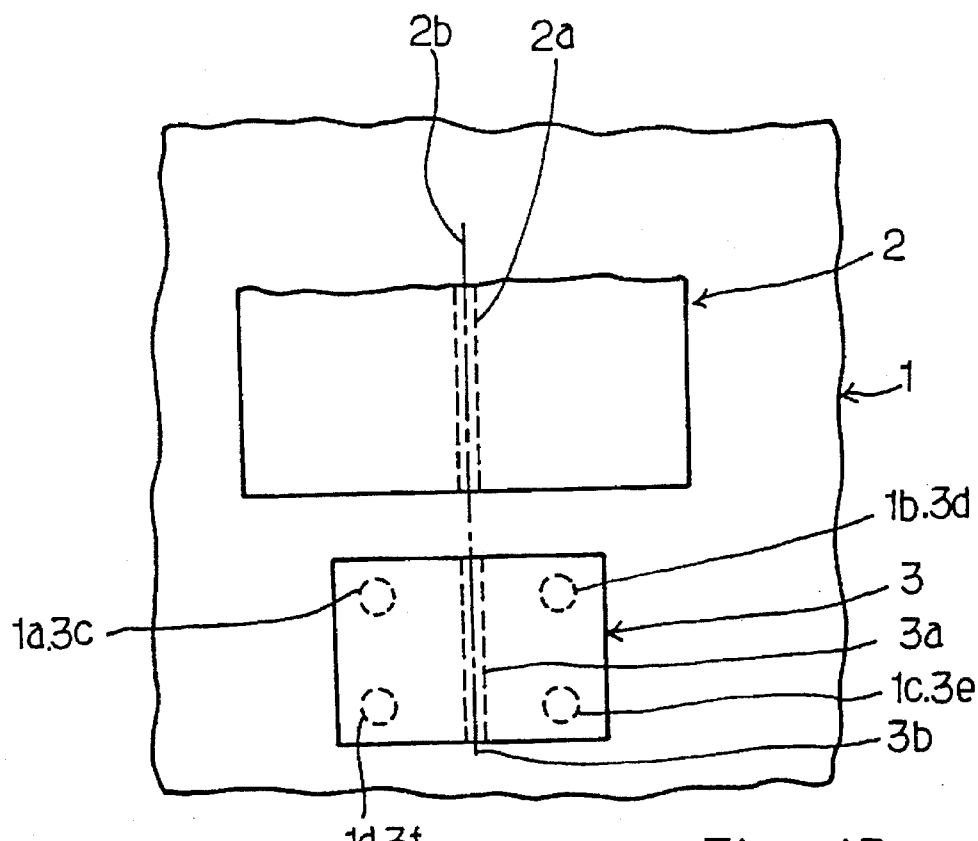
Figure 2B:
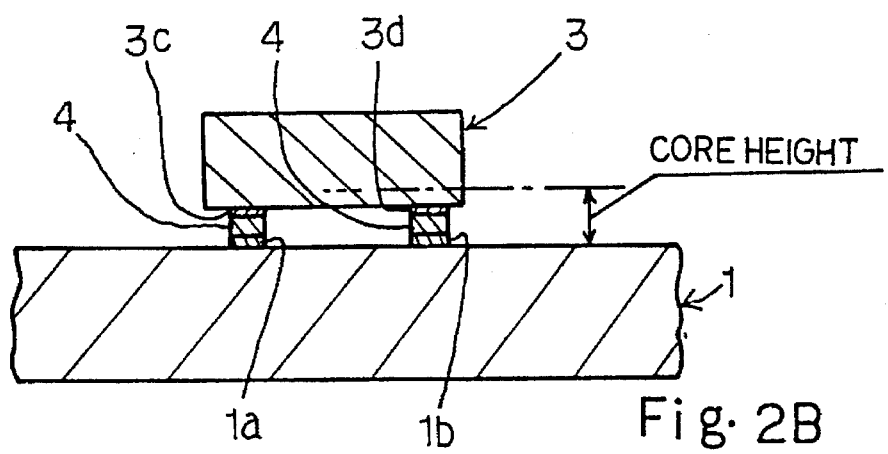

A method of assembling an optical module embodying the present invention is hereinbelow described with reference to FIGS. 4A and 4B, FIGS. 5A and 5B and FIGS. 6A and 6B. The three axis reference system is indicated by arrows "x", "y" and "z", and FIGS. 6A and 6B are seen from the right side of the structure shown in FIGS. 4A and 4B.

The method starts with preparation of a silicon substrate 11. First pads 11a, 11b, 11c, 11d, 11e, 11f, 11g, 11h, 11i and 11j are formed on a major surface of the silicon substrate 11 by using lithographic techniques. Namely, titanium/platinum/gold layers are laminated on the major surface of the silicon substrate 11, and a pattern is transferred from a reticle (not shown) to a photo-resist layer (not shown) covering the titanium/platinum/gold layers. The photo-resist layer is developed, and is patterned. Using the patterned photo-resist layer, the titanium/platinum/gold layers are partially etched away, and are patterned into the first pads 11a to 11j.

Each of the first pads 11a to 11j is shaped into a generally rectangular parallelopiped configuration, and is 140 microns in length and 25 microns in width. However, the corners of each first pad 11a to 11j are rounded, and the round corners allow solder to spread over the entire upper surface of the first pads 11a to 11j.

The first pads 11a, 11c, 11f and 11i have respective longitudinal axes parallel to the y-direction, and the other first pads 11b, 11d, 11e, 11g, 11h and 11j have respective longitudinal axes parallel to the x-direction. Thus, the first pads 11a, 11c, 11f and 11i are different from the other first pads 11b, 11d, 11e, 11g, 11h and 11j at right angle. Although the corners are rounded, the upper surface of the first pad is generally rectangular, because the side lines and the end lines are almost linear.

Subsequently, an optical wave-guide structure 12 is formed on the major surface of the silicon substrate 11 by using the lithographic techniques. The optical wave-guide structure 12 has a plurality of cores 12a, 12b, 12c and 12d so as to propagate laser light therealong. The cores 12a to 12d are patterned by using a photo-resist mask (not shown), and the pattern is transferred from another reticle to a photo-resist layer. When the photo-resist layer is developed, the photo-resist layer is formed into the photoresist mask. Thus, the first pads 11a to 11j and the cores 12a to 12d are formed by using the lithographic techniques, and are located at relative positions on the major surface of the silicon substrate 11 defined by the two reticles. The lithographic techniques accurately determine the relative positions between the first pads 11a to 11j and the cores 12a to 12d, and the accuracy of the relative positions is equivalent to the accuracy of the mask alignment in the lithographic apparatus.

A laser diode array 13 has active layers 13a to 13d, and laser light beams are radiated from the active layers 13a to 13d. For this reason, each of the active layers 13a to 13d serves as a port.

On the back surface of the laser diode array 13 are formed a plurality of second pads 13e, 13f, 13g, 13h, 13i, 13j, 13k, 13m, 13n and 13o which are patterned through the lithographic techniques. The lithographic techniques exactly locate the plurality of second pads 13e to 13o at relative positions with respect to the active layers 13a to 13d, and the relative positions between the second pads 13e to 13o and the active layers 13a to 13d are equivalent to the relative positions between the first pads 11a to 11j and the cores 12a to 12d.

The second pads 13e, 13g, 13j and 13n have respective longitudinal axes extending in the y-direction, and are in parallel to the active layers 13a to 13d. The other second pads 13f, 13h, 13i, 13k, 13m and 13o have respective longitudinal axes extending in the x-direction, and are perpendicular to the longitudinal axes of the second pads 13e, 13g, 13j and 13n.

The plurality of second pads 13e to 13o are respectively corresponding to the plurality of first pads 11a to 11j, and each of the second pads 13e to 13o is shaped into the same rectangular parallelopiped configuration as the corresponding first pad 11a to 11j. Namely, the corners of each second pad are also rounded, and the lower surface is generally rectangular.

It is not necessary to prepare the optical wave-guide structure 12 and the first pads 11a to 11j before the preparation of the laser diode array 13. There is no problem if the silicon substrate 11 and the laser diode array 13 are completed before solder bumps.

Figure 3A:
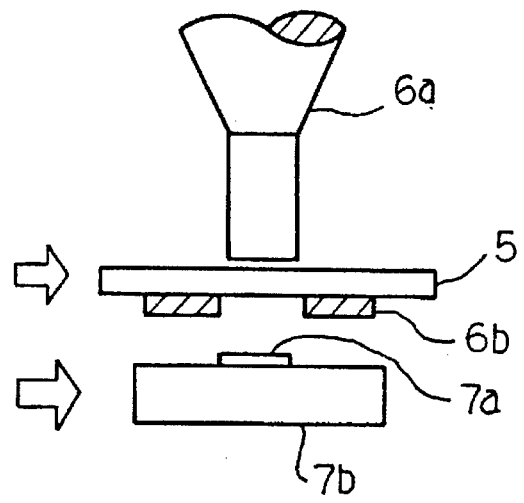
FIGS. 3A to 3C are side views showing the prior art process of forming the bumps on the pads.
Figure 3B:
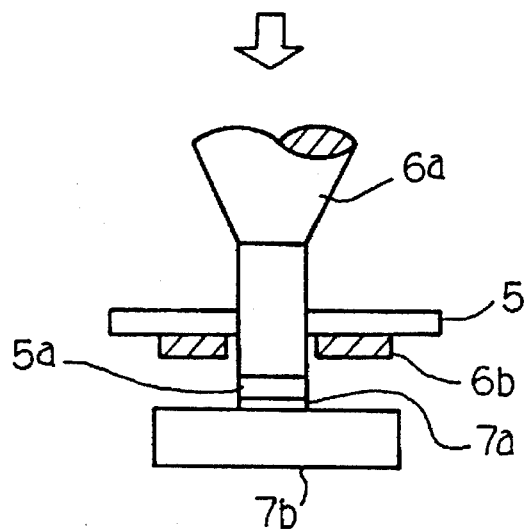
Figure 3C:
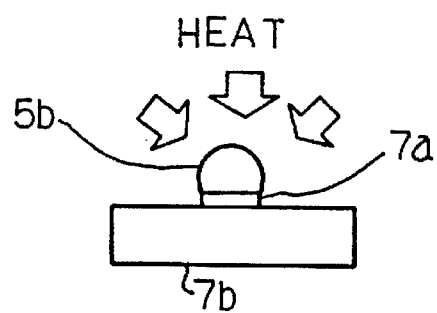

Subsequently, solder bumps 14 are provided on the plurality of first pads 11a to 11j, respectively. The solder bumps 14 are formed from a Au-Sn alloy foil (not shown) by using a punching, and the pieces of Au-Sn alloy are reflowed in a high temperature inert atmosphere as described in conjunction with FIGS. 3A to 3C. The pieces of Au-Sn alloy is uniform in volume, and the solder pieces keeps the height of the laser diode array 13 from the silicon substrate 11 constant.

If a strictly controlled composition is not required or a cost is ignoreable, eutectic Au-Sn alloy may be plated or deposited through a vacuum evaporation onto the first pads 11a to 11j. The eutectic Au-Sn alloy is reflowed so as to form the solder bumps 14. The eutectic Au-Sn alloy may contain gold at 80 weight percent and tin at 20 weight percent. When the vacuum evaporation is used, the eutectic Au-Sn alloy is deposited to 16 microns, and the cost is increased. On the other hand, when the plating is used, the thickness is dispersed within ±20 percent, and is undesirable for the single mode optical coupling.

The amount of Au-Sn alloy on the first pad 11a to 11j is about 56550 cubic microns.

Figure 4A:
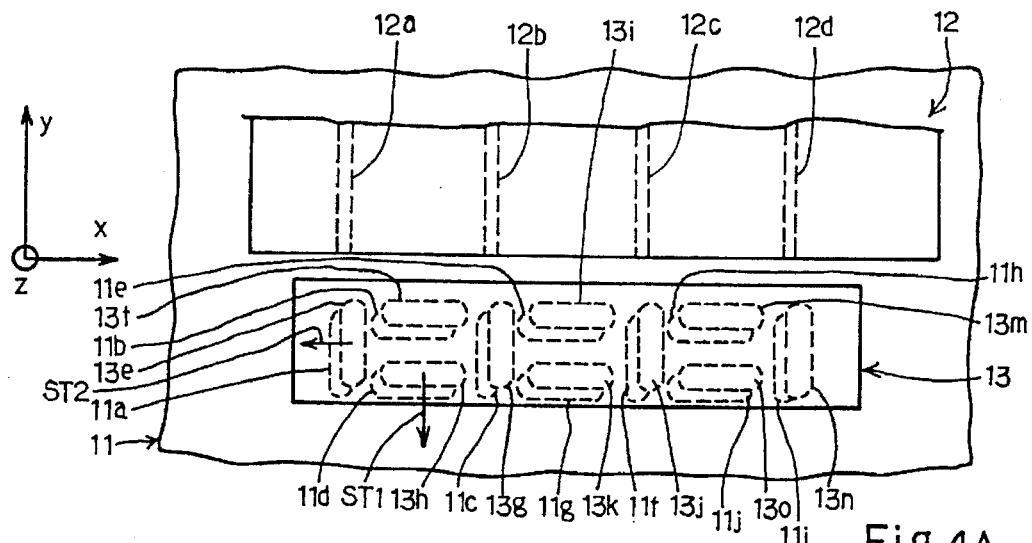
FIGS. 4A and 4B are plan views showing a method of assembling an optical device according to the present invention.
Figure 5A:
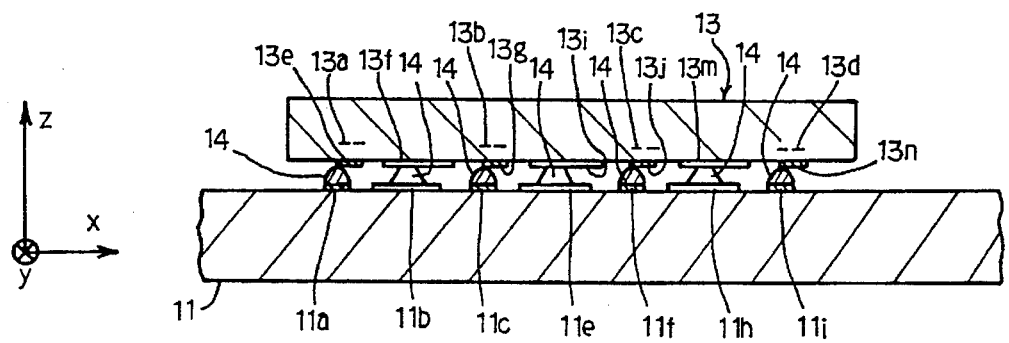
FIGS. 5A and 5B are cross sectional views showing the method according to the present invention.
Figure 6A:
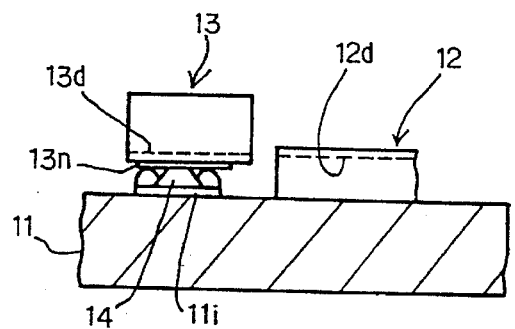
FIGS. 6A and 6B are cross sectional views showing the method according to the present invention from a different angle.
Figure 6B:
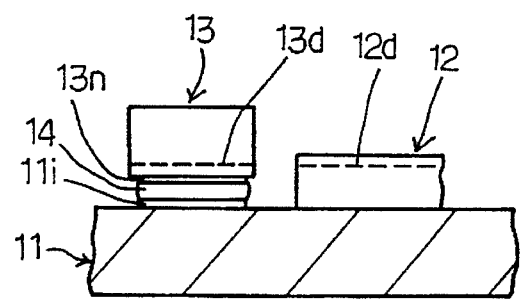

Subsequently, the laser diode array 13 is put on the solder bumps 14, and the second pads 13e to 13o may be offset from the corresponding first pads 11a to 11j as shown in FIGS. 4A, 5A and 6A.

Figure 4B:
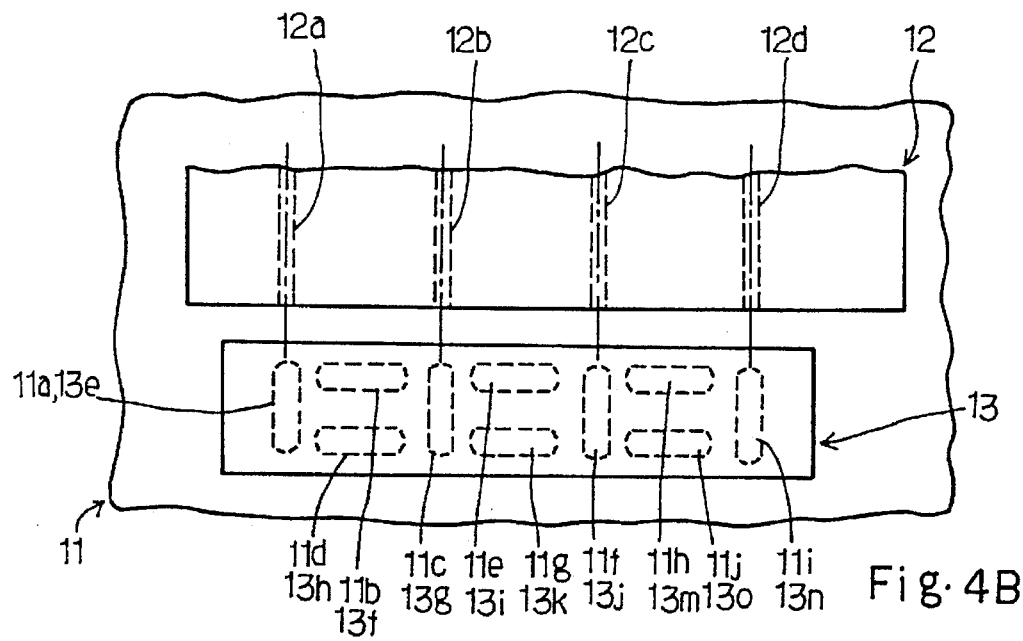
Figure 5B:
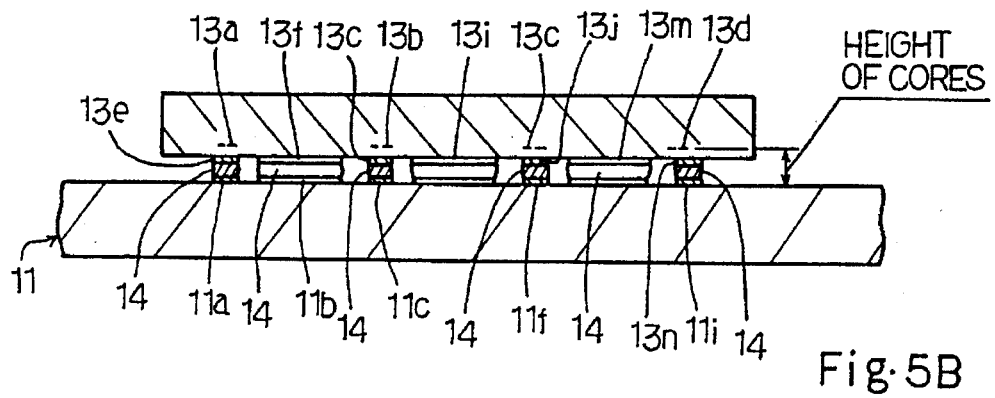

The solder bumps 14 are reflowed in a nitrogen atmosphere, and no flux is used. The surface tension causes the second pads 13e to 13o to automatically register with the first pads 11a to 11j, respectively. In detail, the surface tension of the reflowed solder bumps 14 on the first pads 11b, 11d, 11e, 11g, 11h and 11j moves the laser diode array 13 in a direction labeled with ST1, and the surface tension of the reflowed solder bumps 14 on the other first pads 11a, 11c, 11f and 11i moves the laser diode array 13 in a direction labeled with ST2. These surface tensions two-dimensionally regulate the laser diode array 13 to the position where the first pads 11a to 11j are exactly overlapped with the second pads 13e to 13o as shown in FIGS. 4B, 5B and 6B. As a result, the optical axes of the active layers 13a to 13d are aligned with the optical axes of the cores 12a to 12d as indicated by dot-and-dash lines in FIG. 4B.

The solder is solidified, and the laser diode array 13 is bonded to the silicon substrate 11. The pieces 14 of Au-Sn alloy provided through the punching are strictly constant in volume, and the joint height is 18 microns plus or minus 1 micron.

As described hereinbefore, the accuracy of the alignment is dependent on the aspect ratio of the bumps 14. The present inventors studied the generally rectangular pads, and concluded that the accuracy of the alignment was dependent on the ratio of the bump height to the pad width. Using solder bumps having different ratios, the present inventors further studied the critical ratio of the bump height to the pad width allowing the first pad and the second pad to register with each other by virtue of the surface tension, and concluded that the critical ratio for the flux-less solder bump is 0.7. In other words, if the flux-less solder bumps had the ratio of the bump height to the pad width equal to or greater than 0.7, the surface tension was large enough to automatically align the optical axes with one another. When flux was used, the critical ratio of the bump height to the pad width was different from the critical ratio for the flux-less solder bumps.

The above described optical module had the ratio of the bump height to the pad width equal to 0.72, and the mis-alignment was within plus or minus 1 micron. When the solder bumps were provided on the circular pads, the mis-alignment was plus or minus 1.5 microns. It was understood that the generally rectangular parallelopiped solder bumps 14 generated large surface tension, and achieved the accurate self-alignemnt. The joint height was 18 microns, and the optical axes of the active layers 13a to 13d were aligned with the optical axes of the cores 12a to 12d in the single mode optical coupling.

As will be understood from the foregoing description, even if the pad is narrow, the long length of the rectangular parallelopiped pad maintains the volume of solder. The narrow width increases the ratio of the bump height to the pad width, and the wide bottom area does not lessen the joint force and the heat radiation capability. Thus, the rectangular parallelopiped pads achieve the miniaturization of the solder bumps without sacrifice of the surface tension.

The large volume prevents the bump height from fluctuation, and allows a designer to decrease a margin of the bump height. The active layers 13a to 13d are accurately adjusted to a target height from the major surface of the silicon substrate 11, and are aligned with the cores of the latest optical wave-guide structure 12 in the single mode optical coupling.

If the width of a pad is much less than the length thereof, it is recommendable to put a plurality of pieces of solder on the pad, because the solder is easily spread over the entire surface.

Second Embodiment

Another method of assembling an optical module is hereinbelow described with reference to FIGS. 7A and 7B and FIGS. 8A and 8B. The assembling sequence is similar to the first embodiment except for the configurations of first and second pads. For this reason, the other components of the optical module are labeled with the same references designating corresponding components of the first embodiment without detailed description.

Figure 7A:
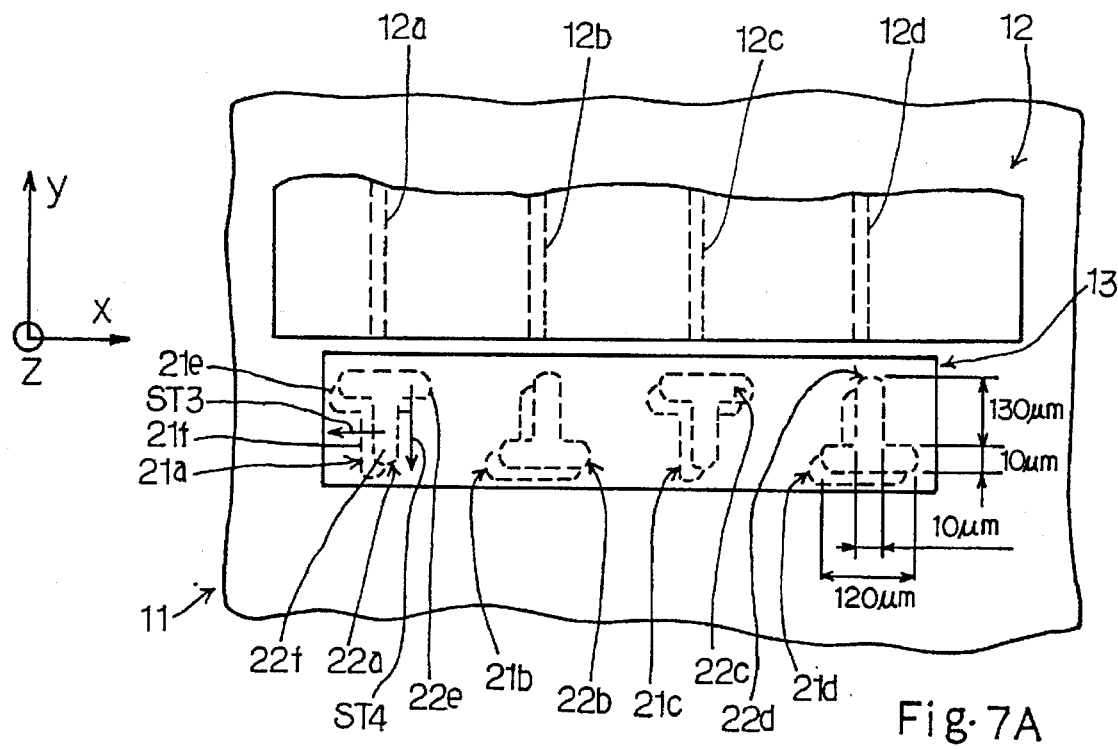
FIGS. 7A and 7B are plan views showing another method of assembling an optical module according to the present invention.
Figure 8A:
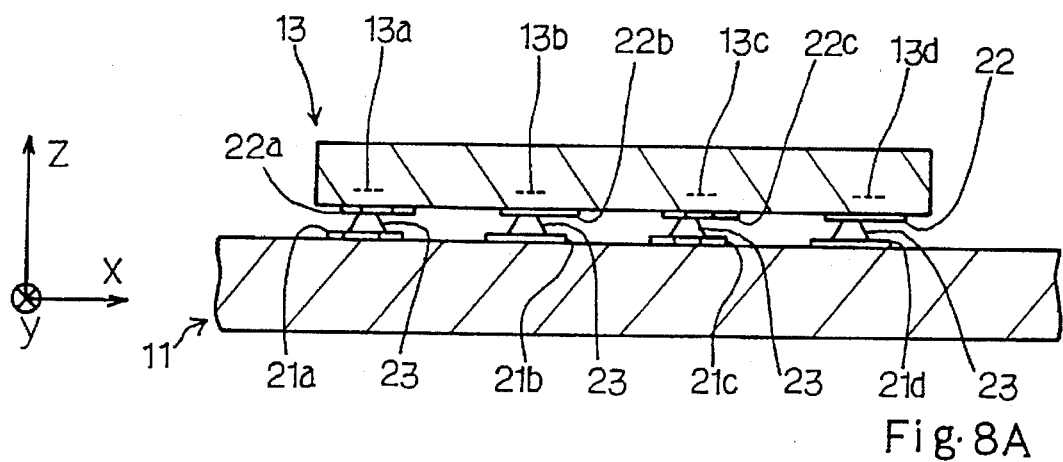
FIGS. 8A and 8B are cross sectional views showing the method according to the present invention.

The first pads 21a, 21b, 21c and 21d are T-letter shaped, and the T-letter shaped pads 21a to 21d are alternately inverted as shown in FIG. 7A. The T-letter shaped pad 21a/21b/21c/21d is broken down into two generally rectangular parallelopiped portions 21e and 21f, and the dimensions of the T-letter shaped pad 21d are written in FIG. 7A. The other T-letter shaped pads 21a to 21c are identical to the T-letter shaped pad 21d. The corners of each T-letter shaped pad 21a/21b/21c/21d are rounded so as to perfectly spread solder over the entire upper surface thereof.

One of the generally rectangular parallelopiped portions 21e has a longitudinal axis parallel to the x-direction, and the other generally rectangular parallelopiped portion 21f is elongated in the y-direction. The y-direction is in parallel to optical axes of the cores 12a to 12d.

The second pads 22a, 22b, 22c and 22d are also T-letter shaped. The T-letter shaped pads 22a to 22d are identical with the T-letter shaped pads 21a to 21d, respectively, and, accordingly, are broken down into two generally rectangular parallelopiped portions 22e and 22f. The corners of each T-letter shaped pad 22a/22b/22c/22d are also rounded. One of the generally rectangular parallelopiped portions 22e has a longitudinal axis extending in the x-direction, and the other generally rectangular parallelopiped portion 22f extends in the y-direction parallel to the active layers 13a to 13d.

The first T-letter shaped pads 21a to 21d are located at relative positions with respect to the cores 12a to 12d by using the lithographic techniques, and the second T-letter shaped pads 22a to 22d are also located at relative positions with respect to the active layers 13a to 13d through the lithographic process. The relative relation between the first T-letter shaped pads 21a to 21d and the cores 12a to 12d is equivalent to the relative relation between the second T-letter shaped pads 22a to 22d and the active layers 13a to 13d.

When the silicon substrate 11 and the laser diode array 13 are prepared, solder bumps 23 are provided on the first T-letter shaped pads 21a to 21d, and the amount of each solder bump 23 is about 25000 cubic microns.

Figure 7B:
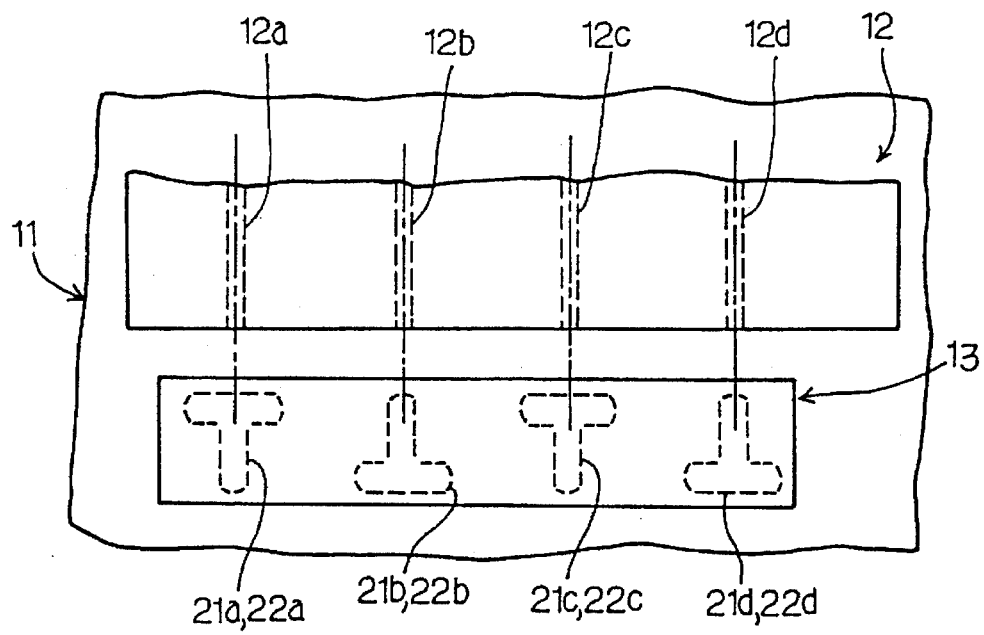
Figure 8B:
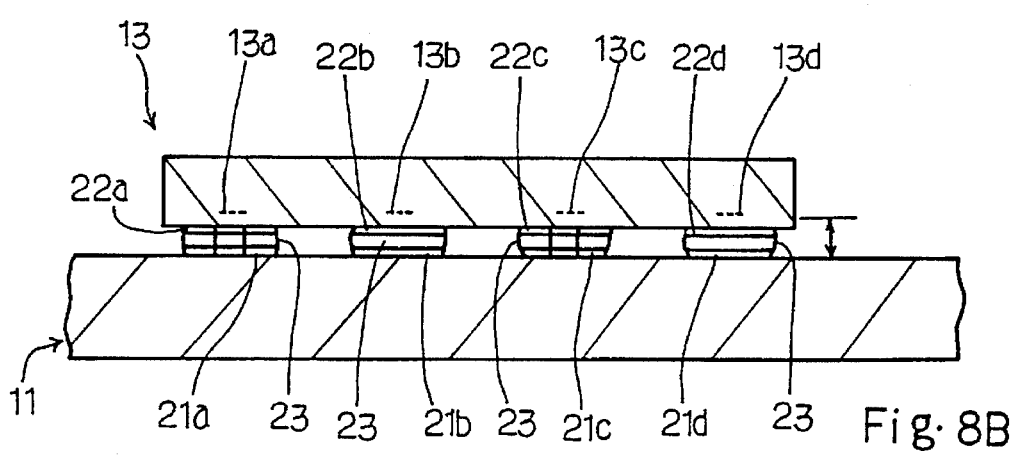

When the solder bumps 23 are reflowed, surface tensions in each solder are exerted in two directions ST3 and ST4 respectively parallel to the x-direction and the y-direction. Thus, each of the reflowed bumps 23 two-dimensionally aligns the relative position between the first T-letter shaped pads 21a to 21d and the second T-letter shaped pads 22a to 22d as shown in FIGS. 7B and 8B.

The T-letter shaped pads 21a to 21d and 22a to 22d are less than the first and second pads 11a to 11j and 13e to 13o, and the step of forming the bumps is simpler than that of the first embodiment.

The second embodiment achieves all the advantages of the first embodiment.

Third Embodiment

Figure 9:
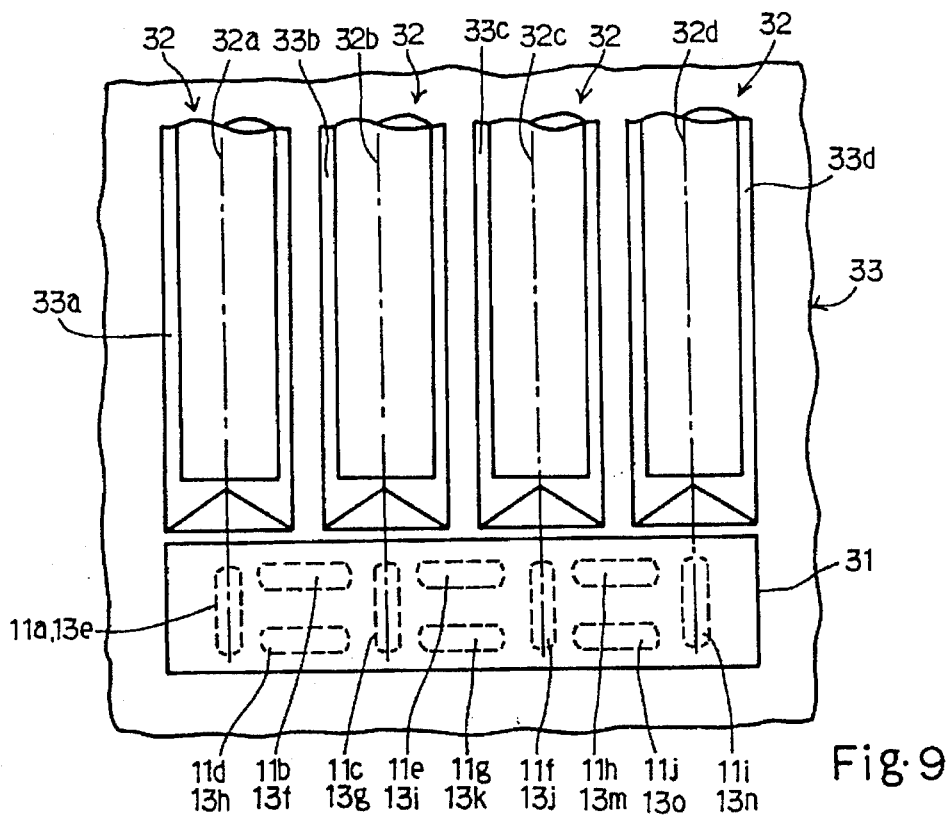
FIG. 9 is a plan view showing the layout of yet another optical module according to the present invention.
Figure 10:
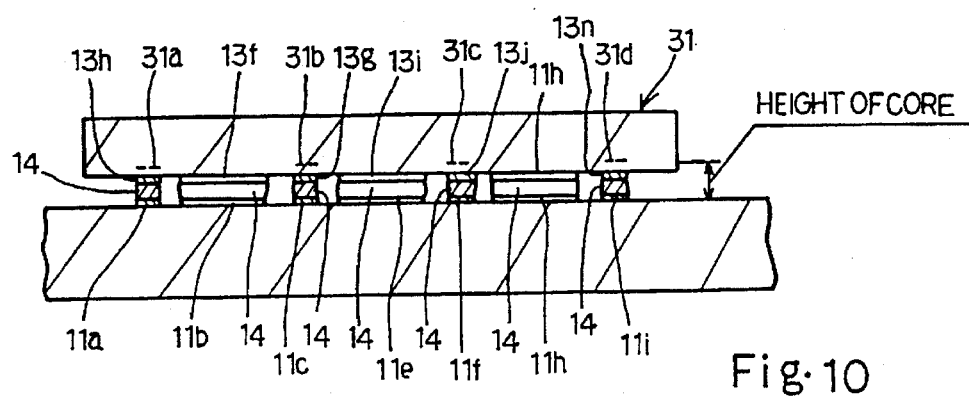
FIG. 10 is a cross sectional view showing the structure of the optical module.
Figure 11:
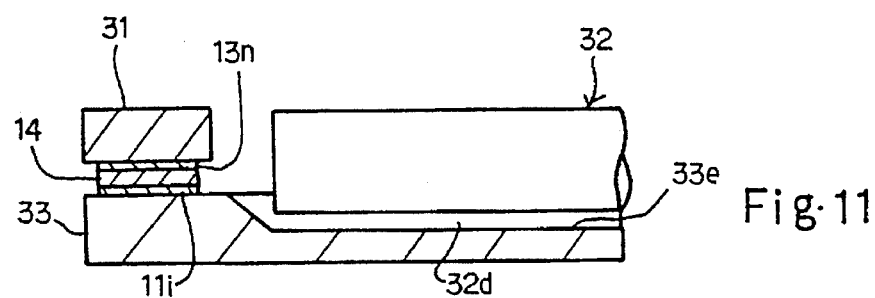
FIG. 11 is a cross sectional view showing the structure of the optical module viewed from another angle.

Turning to FIGS. 9, 10 and 11 of the drawings, active layers 31a to 31d of a laser diode array 31 are aligned with cores 32a to 32d of optical fibers 32 through the self-align solder bonding according to the prevent invention.

The first pads 11a to 11j are formed on a silicon substrate 33 similar to those of the first embodiment by using the lithographic techniques, and v-shaped grooves 33a to 33d are further formed in the silicon substrate 33 by using the lithographic process followed by an anisotropic etching. The relative relation between the first pads 11a to 11j and the bottom edge lines 33e of the v-shaped grooves 32a to 32d is accurately defined by the lithographic process.

The second pads 13e to 13o are patterned on the back surface of the laser diode array 31 similar to the first embodiment. The relative relation between the second pads 13e to 13o and the active layers 31a to 31d is accurately defined by the lithographic process.

The solder bumps 14 are provided on the first pads 11a to 11j, respectively, and the laser diode array 31 is put on the solder bumps 14. The solder bumps 14 are reflowed, and the surface tension causes the second pads 13e to 13o to register with the first pads 11a to 11j. This results in the self-alignment between the optical axes of the active layers 31a to 31d and the optical axes of the optical fibers 32.

The solder is solidified, and the laser diode array 31 is bonded to the silicon substrate 33. The ratio of the bump height to the pad width is equal to that of the first embodiment, and the same accuracy is achieved.

Although particular embodiments of the present invention have been shown and described, it will be obvious to those skilled in the art that various changes and modifications may be made without departing from the spirit and scope of the present invention.

In the second embodiment, the first and second pads 21a to 21d and 22a to 22d are shaped into the T-letter configuration. However, any configuration is available in so far as the configuration is broken down into the generally rectangular parallelopiped portions. Such an available configurations are an L-letter shape and a ▌ + shape.

Solder may be PbSn alloy or AuSi alloy.

What is claimed is:

1. An optical module fabricated on a substrate, comprising:

an optical wave propagation means formed on said substrate, and having a core propagating light;

a plurality of first pads formed on said substrate, and located at certain relative positions with respect to said core, each of said plurality of first pads having at least one generally rectangular upper surface; and an optical element having a port aligned with said core so as to allow said light to pass therethrough and a plurality of second pads located at said certain relative positions with respect to said port and bonded through solder bumps to said plurality of first pads, each of said plurality of second pads having at least one generally rectangular lower surface with which said at least one generally rectangular upper surface is overlapped.

2. The optical module as set forth in claim 1, in which said plurality of first pads are divided into first and second groups, said generally rectangular upper surface of each of the first pads of said first group having a longitudinal direction substantially parallel to an optical axis shared between said port and said core, said generally rectangular upper surface of each of the first pads of said second group having a longitudinal direction substantially perpendicular to said optical axis.

3. The optical module as set forth in claim 1, in which each of said plurality of first pads has a generally rectangular parallelopiped configuration, and each of said plurality of second pads has said generally rectangular parallelopiped configuration.

4. The optical module as set forth in claim 3, in which corners of said generally rectangular parallelopiped configuration are rounded.

5. The optical module as set forth in claim 3, in which said plurality of first pads are divided into first and second groups, said generally rectangular parallelopiped configuration of each of the first pads of said first group having a longitudinal direction substantially parallel to an optical axis shared between said port and said core, said generally rectangular parallelopiped configuration of each of the first pads of said second group having a longitudinal direction substantially perpendicular to said optical axis.

6. The optical module as set forth in claim 1, in which each of said plurality of first pads is a combination of generally rectangular parallelopiped portions, and each of said plurality of second pads is said combination of said generally rectangular parallelopiped portions.

7. The optical module as set forth in claim 6, in which said combination has rounded corners.

8. The optical module as set forth in claim 6, in which said combination of said generally rectangular parallelopiped portions has one T-letter configuration and said plurality of first pads shaped into said T-letter configuration are alternately inverted.

9. The optical module as set forth in claim 6, in which one of said generally rectangular parallelopiped portions forming a lateral bar of said T-letter configuration has a longitudinal axis perpendicular to an optical axis shared between said core and said port, and the other of said generally rectangular parallelopiped portions forming a vertical bar of said T-letter configuration has a longitudinal axis parallel to said-optical axis.

10. A method of assembling an optical module, comprising the steps of:

forming a plurality of first pads and a core of an optical wave propagation means on an upper surface of a substrate and a plurality of second pads on a back surface of an optical element by using lithographic techniques, said plurality of first pads being located at certain relative positions with respect to said core, said plurality of second pads being located at said certain relative positions with respect to a port of said optical element, each of said plurality of first pads having at least one generally rectangular upper surface, each of said plurality of second pads having at least one generally rectangular lower surface corresponding to said at least one generally rectangular upper surface;

placing solder pieces on said plurality of first pads, respectively;

heating said solder pieces for forming solder bumps on said plurality of first pads;

putting said optical element on said solder bumps in such a manner that said solder bumps are respectively brought into contact with said plurality of second pads;

reflowing said solder bumps so as to self-align said at least one generally rectangular upper surface of each of said plurality of first pads with said at least one generally rectangular lower surface of each of said plurality of second pads, thereby causing said port to be aligned with said core; and bonding said plurality of first pads to said plurality of second pads through a solidification of said solder bumps.

11. The method as set forth in claim 10, in which a ratio of a height of said solder bumps to a width of said at least one generally rectangular surface is equal to or greater than 0.7.

12. The process as set forth in claim 10, in which each of said solder bumps is divided into a plurality of solder pieces.

13. The process as set forth in claim 10, in which said solder pieces are formed from a solder foil by using a punching technique.

* * * * *